May 14, 1968 P. BARTSCH ETAL 3,382,718
AUTOMATIC WARBURG MANOMETER FOR THE CONSTANT VOLUME MEASUREMENT
AND RECORDING OF THE PRESSURE OF ONE OR A PLURALITY OF
CLOSED SYSTEMS
Filed Sept. 1, 1966 3 Sheets-Sheet 1

INVENTORS
PETER BARTSCH
RUDOLF STROBL

BY
NOLTE & NOLTE
ATTORNEYS

INVENTORS
PETER BARTSCH
RUDOLF STROBL

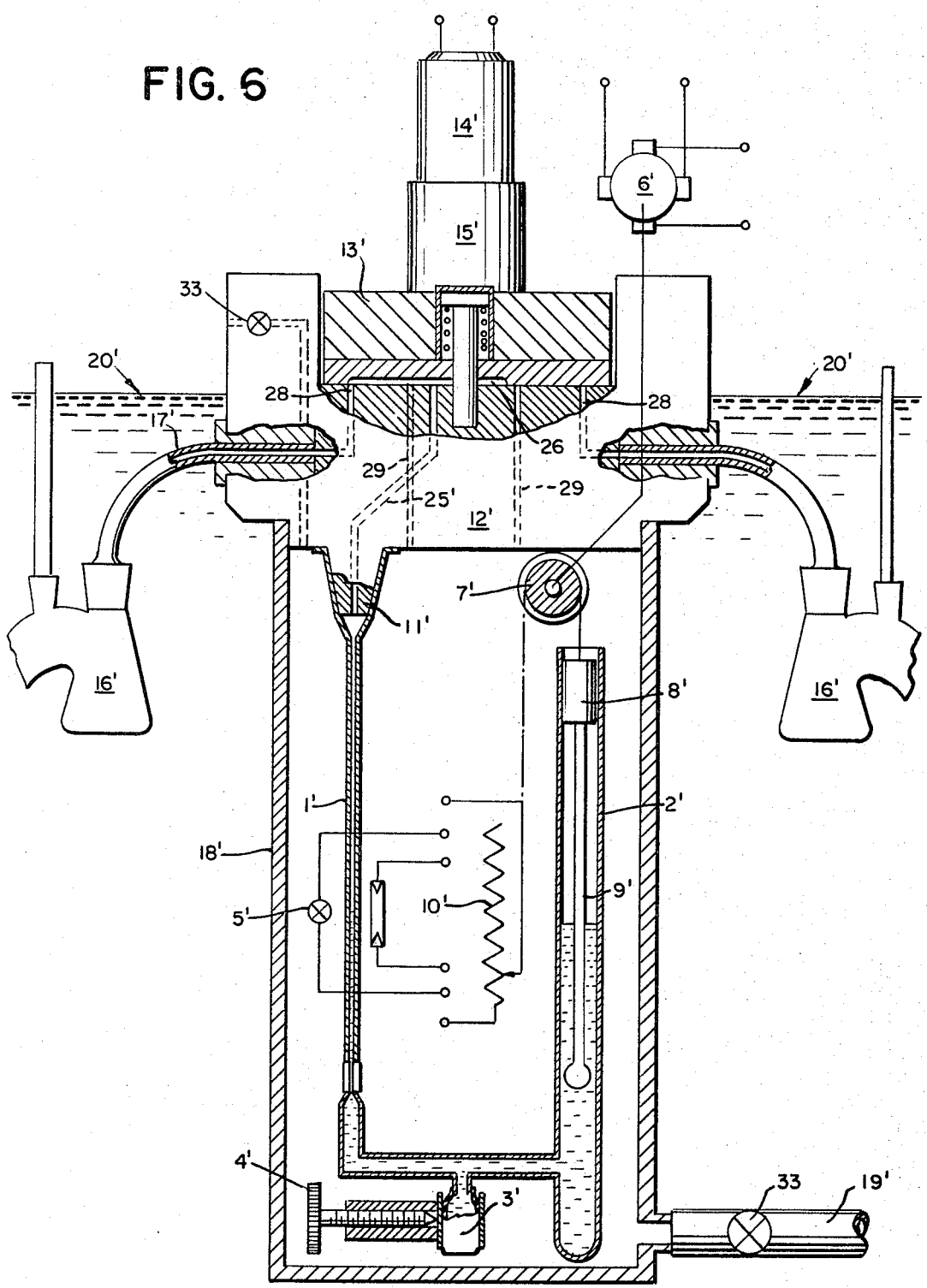

United States Patent Office 3,382,718
Patented May 14, 1968

3,382,718
AUTOMATIC WARBURG MANOMETER FOR THE CONSTANT VOLUME MEASUREMENT AND RECORDING OF THE PRESSURE OF ONE OR A PLURALITY OF CLOSED SYSTEMS
Peter Bartsch and Rudolf Strobl, Berlin, Germany, assignors to VEB Glaswerke Stutzerbach, Stutzerbach, Thuringia, Germany
Filed Sept. 1, 1966, Ser. No. 576,702
11 Claims. (Cl. 73—401)

The present invention relates to an automatic Warburg manometer. More particularly, the invention relates to an automatic Warburg manometer for constant volume measurement and recording of the pressure of one or more closed systems.

The known Warburg manometer WP 42,981 comprises a photoelectric release device, which at constant volume, responds to pressure changes which develop due to biochemical gas reactions occurring in reaction vessels and converts such pressure changes into electrical values. In the Warburg manometer, WP 42,981, the closed shank of a U-tube, which is connected with a reaction vessel, is a capillary tube and the open shank of said U-tube is a wide or large diameter, large volume tube. A photo-release device is positioned at approximately the height or level of the zer point of the closed shank or capillary tube; said zero point being at the center of said closed shank. The closed shank or capillary tube includes a branch which opens into a ground conical mouth. The mouth is closed by an elastic membrane which is clamped by a ring. The ring is fastened to a lever which is subjected to the force of a spring and is subject to the energization of an electromagnet. A replacer rod is positioned in the center of the open shank of the U-tube. The replacer rod may be lifted and lowered and is coupled to a motor by suitable gearing. The replacer rod is coupled to a rheostat. The motor is coupled to the photoelectric release device via a transistor relay. The rheostat operates an indicating, registering or recording device.

For the purpose of temperature adjustment or correction, a gas thermometer of similar design is utilized with the manometer. The rheostat of the thermometer is connected in series with the rheostat of the manometer. The vessel of the gas thermometer, which is a reaction vessel, operates as a temperature and air pressure dependent pressure supply source. The rheostats of the gas thermometer and the Warburg manometer, which are of equal dimensions, operate with counter or opposite direction currents to eliminate temperature and air pressure influences which act on both instruments simultaneously and with the same effect.

Each of the reaction vessels of the Warburg apparatus is provided with a manometer and a gas thermometer. The entire apparatus functions in accordance with a programmed control system, so that only one adjusting relay is required, on the one hand, for the reaction vessels' manometers and another adjusting relay is required, on the other hand, for the gas thermometers. Upon initial operation of the apparatus, the zero point level is adjusted first, then the desired time interval is adjusted, and both adjustment relays of the manometer and gas thermometer, are then switched to the first pair of instruments. The adjustment of relays operate a motor which varies the position of the replacer rod in the open shank of the U-tube in accordance with the height or level of the liquid in the closed shank of the U-tube, which liquid level depends upon the pressure in the reaction vessel or gas thermometer vessel. The total resistance thus provided by the rheostats is registered or recorded via a bridge connection of a compensated recorder as the pressure value. For zero balancing, the membrane of the closed shank is simultaneously released, and both the manometer and the gas thermometer are opened for a short time. During this time, the systems are set back to the initial position. Subsequently, both instruments are closed and the adjustment relays are switched to the next pair of instruments.

A disadvantage of the Warburg manometer WP 42,981 is that large parts of the manometer are not thermostatic or temperature controlled or temperature constant. Furthermore, the open shank of the U-tube is in communication with the outside atmosphere, so that small air pressure deviations appear as errors in the measured results. Also, zero balancing against the non-thermostatic or non-temperature controlled external atmosphere creates deviations or variations in the measuring system. The zero balancing mechanism, after termination, leaves non-constant pressure differences. Zero balancing against adjusted gas mixtures of pure gases is impossible, so the gas pressures in the reaction vessel cannot be externally influenced. These deficiencies effect the accuracy or quality of the measured results. Furthermore, the manometers of the apparatus are subject to different zero point drifting. Costs are relatively high, since each reaction vessel requires a manometer and a gas thermometer. Thus, space requirements are also relatively high and control of the apparatus is difficult.

The principal object of the present invention is to provide a new and improved automatic Warburg manometer. The manometer of the present invention measures and registers or records pressure variations which occur in closed systems due to biochemical reactions per variable time unit in several reaction vessels at high stability of the gas composition in each single reaction vessel, at very high constancy of volume of the pressure measured and high variability of the sensitivity as pressure or self-acting converted volume values with or without thermobarometric correction or self-compensation, and with low costs and a small amount of required measuring and controlling equipment. The manometer of the present invention is compact, may include vibration equipment, is easy to control, simple to operate and include a thermometer having self-acting thermobarometric compensation. The Warburg manometer of the present invention provides selective or programmed ON and OFF switching of several reaction vessels to a single manometer and provides automatic pressure compensation against a thermostatic or temperature controlled gas atmosphere which may serve as a closed atmosphere for self-acting thermobarometric compensation. The manometer of the present invention operates with efficiency, effectiveness and reliability. The manometer of the present invention provides very high quality measurements. The recorded results contain either only the pressure of volume variation per unit time, or if the pressure of only a single vessel is measured, the instantaneous pressure or volume. The parts and existing gas spaces of the manometer of the present invention are temperature-controlled to the highest possible degree. The quality of the recorded results is increased by the high stability of the gas composition in each reaction vessel. This is important especially for biochemical gas reactions, since variations of the gas composition influence the reaction of a biological object retroactively. In the manometer of the present invention, the open shank of the U-tube manometer may communicate with a thermostatic or temperature-controlled gas atmosphere, and zero balancing is achieved against a thermostatic or constant temperature atmosphere such as, for example, pure oxygen or other gas. The selective coupling of any selected number of reaction vessels with a single common manometer limits to a minimum the number of measuring and controlling devices. All the reaction vessels in the system, and, as the case may be, an empty or zero valve vessel, are subject to the same zero point drift.

In accordance with the present invention, automatic manometer apparatus includes a U-tube manometer having a closed shank comprising a capillary tube having a zero point and an open shank having a diameter which is wide relative to that of the capillary tube and a plurality of reaction vessels each having a constant volume pressure to be measured. A gas reservoir is positioned in a bath of temperature controlled fluid. The gas reservoir has an open top. The U-tube manometer is positioned in the gas reservoir. A multiple duct face plate cock encloses the open top of the gas reservoir and selectively fluid-couples the capillary tube of the manometer to each of the reaction vessels to enable the selective measurement of the pressure of each of the reaction vessels.

The multiple duct face plate cock comprises a rotary part having a sealing surface. A groove is formed in the sealing surface of the rotary part and a duct extends from the groove to the sealing surface of the rotary part. A stationary part has a sealing surface in operative proximity with the sealing surface of the rotary part. A duct extends from and cooperates with the duct of the rotary part at the sealing surface to the capillary tube of the manometer. A plurality of ducts extend from the sealing surface of the stationary part to a plurality to spaced outlets for connection to a plurality of reaction vessels. Moving means coupled to the rotary part of the cock rotates the rotary part about an axis of rotation to selectively position the groove in the sealing surface of the rotary part over selected ones of the plurality of ducts of the stationary part of the cock thereby to fluid-couple the selected ones of the ducts to the capillary tube of the manometer via the cooperating ducts of the rotary and stationary parts of the cock. The plurality of ducts of the stationary part of the cock are positioned on different radii and on different concentric circles of the sealing surface of the stationary part. Ducts on a circle of larger radius extend to the plurality of spaced outlets and ducts on a circle of smaller radius open into the gas reservoir.

In one embodiment of the present invention, the rotary part of the cock comprises a ring slot formed in the sealing surface thereof and merging with the groove thereof. The ring slot is constantly fluid-coupled and in cooperation with the cooperating duct of the stationary part of the cock. The ring slot is coaxial with the axis of rotation of the rotary part. The cooperating ducts of the rotary and stationary parts of the cock may be coaxial with the axis of rotation of the rotary part of the cock or the cooperating duct of the statioinary part of the cock may be of angular configuration and may be spaced from the axis of rotation of such rotary part.

In order that the present invention may be readily carried into effect, it will now be described with reference to the accompanying drawings, wherein:

FIG. 6 is a schematic diagram, partly in section, of another embodiment of the manometer of the present invention wherein the gas reservoir functions as a compensation vessel.

Figure 1:
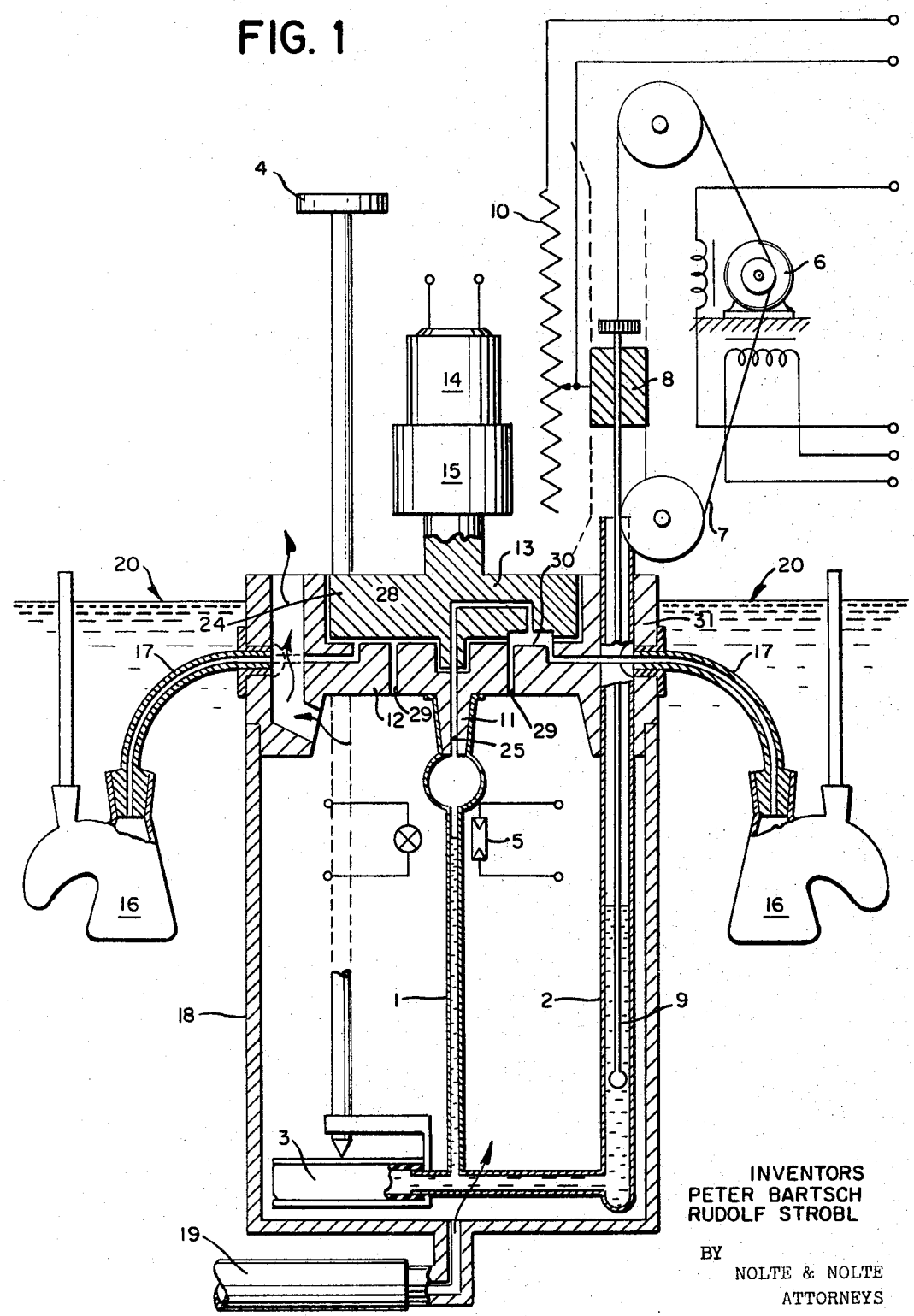
FIG. 1 is a schematic diagram, partly in section, of an embodiment of the manometer of the present invention.

In FIGS. 1 and 6, the Warburg manometer of the present invention comprises a thermostat bath with a liquid level 20. A liquid or pressure sealed gas reservoir 18 is positioned in the bath. The upper opening of the reservoir is covered with a multiple duct face plate cock 24. The multiple duct face plate cock 24 is positioned between the closed shank of a U-tube capillary tube 1 and a plurality of reaction vessels 16. The reaction vessels 16 are positioned around the closed shank.

The cock 24 comprises a stationary part 12 and a rotary part 13. The stationary and rotary parts 12 and 13 have adjacent, facing, planar-ground and highly polished surfaces which develop a sealing adhering force after brief contact pressure. Such surfaces thus function as sealing surfaces. The sealing force is enhanced by a liquid film such as, for example, silicon, oil, or the like. The stationary part 12 is coupled by a releasable, but rigid coupling 11 to the closed shank 1 of the U-tube. The coupling 11 comprises a projecting core having a ground surface which seats in a receiving receptacle of substantially conical configuration having a ground inner surface.

A bored fully extending central channel or duct 25 extends to the closed shank of the U-tube. In the embodiment of FIG. 6, the duct 25' is not at the axis of rotation and opens into a ring slot 26. The ring slot 26 of FIG. 6 is concentrically positioned around the axis of rotation on the sealing surface of the rotary part 13'.

Figure 2:
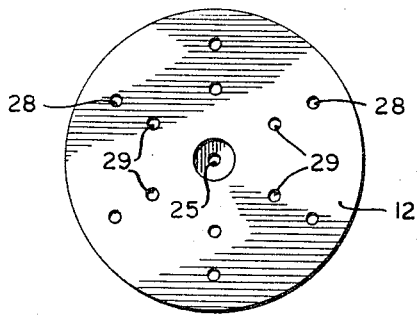
FIG. 2 is a top view of the stationary part of an embodiment of the multiple duct face plate cock of the manometer of FIG. 1.
Figure 4:
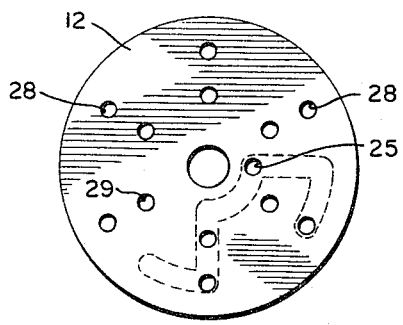
FIG. 4 is a top view of the stationary part of another embodiment of the multiple duct face plate cock of the manometer of FIG. 1.

The stationary part 12 of the cock 24 has a plurality of bores or ducts 28 and 29 formed therein on concentric circles of different radii from the axis of rotation, as shown in FIGS. 2 and 4. The ducts 28 are on a circle of larger radius and the ducts 29 are on a circle of smaller radius. The number of ducts depends upon the number of reaction vessels utilized with the manometer. The ducts are positioned on diametrical lines of the stationary part 12 as well as on the cencentric circles. In FIGS. 2 and 4, the stationary part 12 is utilized to couple the manometer to six reaction vessels 16.

As shown in FIG. 1, the outer ducts 28 are coupled to the reaction vessels 16 by capillary type pipe angles or elbows 17. Each capillary elbow 17 is flanged to the cock housing 31 by ground ball and socket joints which are rotary and may be fixed in position. The inner positioned ducts 29 (FIGS. 2 and 4) of the stationary part 12 open into the thermostatic or temperature-controlled gas reservoir 18. The gas reservoir 18 is continuously supplied with pure oxygen or other gases via a pipe or hose inlet 19.

Figure 3:
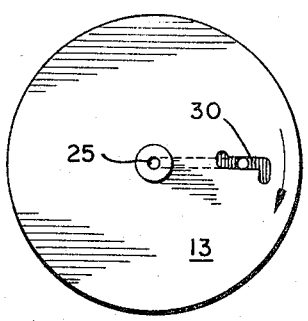
FIG. 3 is a bottom view of the rotary part of the embodiment of FIG. 2 of the multiple duct face plate cock of the manometer of FIG. 1.
Figure 5:
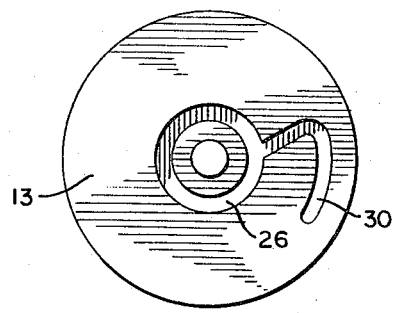
FIG. 5 is a bottom view of the rotary part of the embodiment of FIG. 4 of the multiple duct face plate cock of the manometer of FIG. 1.

The duct 25 of the stationary part 12 opens into another central or axial bored channel or duct formed in the rotary part 13, as shown in FIG. 1. The duct 25' of the stationary part 12' opens into the ring slot 26, as shown in FIG. 6. The closed shank of the U-tube or capillary tube 1 is thus fluid-coupled with an angled slot 30 (FIGS. 1, 3 and 5) formed in the sealing surface of rotary part 13. A synchronous motor 14 drives the rotary part 13 of the multiple duct face plate cock 24 and is connected to a program control device 15 of known type.

The closed shank U-tube or capillary tube 1 positioned in the gas reservoir 18 and large diameter, large volume tube 2 positioned in said reservoir, are connected at their knees to a supply vessel 3. The supply vessel 3 is variable in volume and comprises flexible material. The volume of the supply vessel 3 may be varied by an adjustment screw 4 in order to adjust the supplied fluid or locking liquid to a determined level.

A photoelectric release device 5 is positioned at the zero point of the closed shank of the U-tube and is electrically connected via an electronic amplifier of known type (not shown) to the input of an adjustment motor 6. The adjustment motor 6 is a reversing motor. A replacer rod 9 is centrally or axially positioned in the open shank, which is a wide, large diameter, large volume tube 2. The replacer rod 9 is linked or coupled to the adjustment motor 6 via a cable line 7. A guide support 8 is utilized to guidedly support replacer rods 9 of different diameters. The replacer rod 9 may be lifted or lowered by the adjustment motor 6 via known gear coupling.

The movement of the replacer rod 9 into and out of the locking liquid in the tube 2 to different extents, causes the displacement of varying quantities of said liquid. Thus, the hydrostatic pressure in the closed shank is varied and, as a result of such pressure variation, the height or level of the locking liquid is varied for as long a time as is required for said liquid to reach the initially adjusted zero point level. The compensating movement $\Delta h$ of the replacer rod, at a pressure variation $\Delta P$ at restored nominal value level of the locking liquid in the closed shank, is obtained from the relation $$r^2vs\pi\Delta h = (r^2os - r^2vs)\Delta P$$

wherein $rvs$ is the radius of the replacer rod, $ros$ is the radius of the open shank and $\Delta P$ is the pressure variation in mm. of locking liquid. Then, $$\Delta h = \left[\frac{r^2os}{r^2vs} 1\right]\Delta P$$

Thus, the hydromechanical sensitivity of the Warburg manometer of the present invention may be varied by utilizing a plurality of replacer rods 9 having different diameters.

The support 8 for the replacer rod 9 is coupled or linked to a rheostat 10, the variable resistance values of which represent a measure of the pressure variations in the reaction vessels 16. The arrangement is provided in such a manner that a linear or directly proportional relation exists between the movement of the replacer rod 9 and the indication, registration or recording of the pressure reading. The rheostat 10 is connected in an electrical measuring bridge of known type to which respective factors are supplied for the conversion of pressure value into volume values. A suitable compensated recorder such as, for example, a dotted line recorder (not shown) is electrically connected to the output of the measuring bridge.

If required, one of the reaction vessels 16 may comprise an empty or zero value vessel for measuring larger objects. For highly sensitive measurements, the entire Warburg manometer may be positioned in the gas reservoir 18', as shown in FIG. 6. The gas reservoir 18' functions as a compensation vessel when valves 33 are closed.

Upon operation of the manometer of the present invention, after completion of the necessary initial preparations, the angled slot 30 formed in the sealing surface of the rotary part 13 of the multiple duct face plate cock 24, fluid-couples each of the reaction vessels 16, one at a time, as illustrated in broken lines in FIG. 4, to the closed shank of the U-tube capillary tube 1. In accordance with the pressure in the reaction vessel 16 then fluid-coupled to the capillary tube 1, the level of the liquid in the closed shank is varied. In accordance with the direction and magnitude of the deviation of the liquid in the closed shank from the zero point or position, the phase condition of the AC electrical balancing bridge (not shown) of the photoelectric release device 5 and the magnitude of the output voltage of said bridge are varied, and the phase sensitive control winding of the adjustment reversing motor 6 is controlled accordingly. The adjustment motor 6 then lifts or lowers the replacer rod 9 via the cable line 7. In accordance with its depth of insertion into the liquid in the open shank 2, the replacer rod 9 displaces more or less liquid, thereby simultaneously varying the hydrostatic pressure in the closed shank 1 and the height or level of the locking liquid therein until the meniscus of said locking liquid reaches the initially adjusted zero point or zero level. At such point, the adjustment motor 6 is stopped by the photoelectric release device 5.

After the measured value has been scanned, the angled slot 30 of the rotary part 13 opens the closed shank 1 and fluid-couples the reaction vessel 16 to the gas reservoir 18. After the pressure compensation is completed, the closed shank 1 and the reaction vessel 16 are uncoupled or separated by rotation of the rotary part 13. After the angled slot 30 of the rotary part 13 is sufficiently rotated, the next reaction vessel 16 is fluid-coupled to the closed shank 1. Thus, successive scanning of the pressure variations of all the reaction vessels 16 is accomplished by rotation of the rotary part 13 of the multiple duct face plate cock 24.

The synchronous motor 14, which drives the rotary part 13, operates a program control device 15 of known type synchronously with the position of the cock 24. The program control device 15 functions, aside from indicating electrically the cock position and controlling an electrical time delay member for temporarily terminating the rotation of the cock, to control the operation of the compensated tape recorder (not shown) to record the measurements, and supplies various factors for each reaction vessel 16 to the measuring bridge. If an automatic thermobarometric correction is required, the electrical value determined by the empty or zero value vessel is utilized to supply a new zero point level to the recorder in accordance with the magnitude of such value. A thermobarometric correction of all other reaction vessels is then instituted in the registration or recording for the assigned measuring period. In the most simple case, the empty or zero value pressure variation of an empty vessel is registered or recorded as such, or as a volume value, and the registration or recording is then utilized as a basis for the later evaluation.

For highly sensitive indications or measurements, the gas reservoir 18' of FIG. 6 is used as a compensation vessel by closing the valves 33. This produces a self-acting, thermobarometric compensation. This applies especially to continuous measurements for only one reaction vessel 16, which may be selected as desired from the plurality of reaction vessels.

While the invention has been described by means of specific examples and in specific embodiments, we do not wish to be limited thereto, for obvious modifications will occur to those skilled in the art without departing from the spirit and scope of the invention.

What is claimed is:

1. In automatic manometer apparatus including a U-tube manometer having a closed shank comprising a capillary tube having a zero point and an open shank having a diameter which is wide relative to that of said capillary tube and a plurality of reaction vessels each having a constant volume pressure to be measured, a bath of temperature controlled fluid;

a gas reservoir in said bath, said gas reservoir having an open top and said U-tube manometer being positioned in said gas reservoir; and a multiple duct face plate cock enclosing the open top of said gas reservoir and selectively fluid-coupling the capillary tube of said manometer to each of said reaction vessels to enable the selective measurement of the pressure of each of said reaction vessels.

2. In automatic manometer apparatus as claimed in claim 1, wherein said multiple duct face plate cock comprises a rotary part having a sealing surface, a groove formed in the sealing surface of said rotary part and a duct extending from the groove formed in said sealing surface to the sealing surface of said rotary part and a stationary part having a sealing surface in operative proximity with the sealing surface of said rotary part, a duct extending from and cooperating with the duct of said rotary part at said sealing surface to the capillary tube of said manometer and a plurality of ducts extending from the sealing surface of said stationary part to a plurality of spaced outlets for connection to a plurality of reaction vessels.

3. In automatic manometer apparatus as claimed in claim 1, wherein one of said reaction vessels has a zero value pressure.

4. In automatic manometer apparatus as claimed in claim 1, said manometer apparatus further including replacer means in the open shank of said manometer for varying the displacement of liquid therein, moving means coupled to said replacer means for moving said replacer means in and out of liquid in said open shank, rheostat means coupled to said moving means for providing an electrical indication of the movement of said replacer means and photosensitive means in operative proximity with the capillary tube of said manometer for deenergizing said moving means.

5. In automatic manometer apparatus as claimed in claim 4, wherein each of the components of said manometer apparatus is positioned in said gas reservoir.

6. In automatic manometer apparatus as claimed in claim 2, further comprising moving means coupled to the rotary part of said multiple duct face plate cock for rotating said rotary part about an axis of rotation to selectively position the groove in the sealing surface thereof over selected ones of the plurality of ducts of the stationary part of said multiple duct face plate cock thereby to fluid-couple said selected ones of said ducts to the capillary tube of said manometer via the cooperating ducts of said rotary and stationary parts.

7. In automatic manometer apparatus as claimed in claim 6, wherein the plurality of ducts of the stationary part of said multiple duct face plate cock are positioned on different radii and on different concentric circles of the sealing surface of said stationary part and wherein ducts on a circle of larger radius extend to said plurality of spaced outlets and ducts on a circle of smaller radius open into said gas reservoir.

8. In automatic manometer apparatus as claimed in claim 6, wherein the rotary part of said multiple duct face plate cock further comprises a ring slot formed in the sealing surface thereof and merging with said groove thereof, said ring slot being constantly fluid-coupled and in cooperation with the cooperating duct of the stationary part of said multiple duct face plate cock.

9. In automatic manometer apparatus as claimed in claim 8, wherin the ring slot of the rotary part of said multiple duct face plate cock is coaxial with the axis of rotation of said rotary part.

10. In automatic manometer apparatus as claimed in claim 8, wherein the cooperating ducts of the rotary and stationary parts of said multiple duct face plate cock are coaxial with the axis of rotation of said rotary part.

11. In automatic manometer apparatus as claimed in claim 8, wherein the cooperating duct of the stationary part of said multiple duct face plate cock is of angular configuration and is spaced from the axis of rotation of said rotary part.

References Cited
UNITED STATES PATENTS 3,345,877  10/1967  Koelle _____ 73—401

DAVID SCHONBERG, *Primary Examiner.*

D. O. WOODEL, *Examiner.*